(12) United States Patent
Chen et al.

(10) Patent No.: US 9,886,665 B2
(45) Date of Patent: Feb. 6, 2018

(54) EVENT DETECTION USING ROLES AND RELATIONSHIPS OF ENTITIES

(71) Applicants: International Business Machines Corporation, Armonk, NY (US); Baylor College of Medicine, Houston, TX (US); The Board of Regents, The University of Texas System, Austin, TX (US)

(72) Inventors: Ying Chen, San Jose, CA (US); Linda H. Kato, San Jose, CA (US); Jacques J. Labrie, Sunnyvale, CA (US); Meenakshi Nagarajan, San Jose, CA (US); William Scott Spangler, San Martin, CA (US); Ioana R. Stanoi, Bronx, NY (US); Anbu Karani Adikesavan, Houston, TX (US); Benjamin J. Bachman, Houston, TX (US); Lawrence A. Donehower, Houston, TX (US); Olivier Lichtarge, Houston, TX (US); Sam J. Regenbogen, Houston, TX (US); Maria E. Terron-Diaz, Houston, TX (US); Angela D. Wilkins, Houston, TX (US); Curtis R. Pickering, Houston, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 655 days.

(21) Appl. No.: 14/564,040

(22) Filed: Dec. 8, 2014

(65) Prior Publication Data
US 2016/0162788 A1 Jun. 9, 2016

(51) Int. Cl.
*G06F 17/00* (2006.01)
*G06N 5/02* (2006.01)

(52) U.S. Cl.
CPC .................................. *G06N 5/025* (2013.01)

(58) Field of Classification Search
CPC combination set(s) only.
See application file for complete search history.

(56) References Cited

U.S. PATENT DOCUMENTS 5,383,120 A    1/1995  Zernik
5,386,556 A    1/1995  Hedin et al.
(Continued)

OTHER PUBLICATIONS

Text mining for security threat detection discovering hidden information in unstructured log messages Candace Suh-Lee; Ju-Yeon Jo; Yoohwan Kim 2016 IEEE Conference on Communications and Network Security (CNS) Year: 2016 pp. 252-260 IEEE Conference Publications.*

(Continued)

*Primary Examiner* — Michael B Holmes
(74) *Attorney, Agent, or Firm* — Garg Law Firm, PLLC; Rakesh Garg; William Stock (57) ABSTRACT

A method, system, and computer program product for event detection using roles and relationships of entities are provided in the illustrative embodiments. A training event and a set of entities participating in the training event are identified in a training data. For a first entity in the set of entities, a first role occupied by the entity in the event is determined. A behavior attribute is assigned to the first role. A relationship of the first role with a second role corresponding to a second entity in the set of entities is determined. An event rule is constructed to detect an event corresponding to the training event in new data and comprising a plurality of roles, behavior attributes, and the relationship. The plurality of roles includes the first role and the second role, and the plurality of behavior attributes includes the behavior attribute assigned to the first role.

20 Claims, 9 Drawing Sheets

(56) References Cited

U.S. PATENT DOCUMENTS

| | | | |
|---|---|---|---|
| 5,694,523 | A | 12/1997 | Wical |
| 5,841,895 | A | 11/1998 | Huffman |
| 8,140,543 | B2 | 3/2012 | Chen et al. |
| 8,402,019 | B2* | 3/2013 | Jin .................... G06F 17/30864 707/723 |
| 8,429,620 | B2* | 4/2013 | Chen .................. G06F 11/3636 714/42 |
| 8,712,926 | B2* | 4/2014 | Behal .................. G06N 99/005 706/12 |
| 8,722,628 | B2* | 5/2014 | Levine ............... C07K 14/4747 436/501 |
| 8,859,736 | B2* | 10/2014 | Ma ......................... C07K 16/28 424/130.1 |
| 9,036,642 | B2* | 5/2015 | Zhao ...................... H04L 45/28 370/395.1 |
| 9,056,841 | B2* | 6/2015 | Pomper ................ C07D 209/14 |
| 9,219,614 | B2* | 12/2015 | Zhao .................. H04L 12/1863 |
| 9,253,082 | B2* | 2/2016 | Zhao ...................... H04L 45/22 |
| 9,264,717 | B2* | 2/2016 | Chen ...................... H04N 19/70 |
| 9,303,087 | B2* | 4/2016 | Ma ......................... C07K 16/28 |
| 9,369,335 | B2* | 6/2016 | Zhao .................. H04L 12/1863 |
| 9,609,347 | B2* | 3/2017 | Thirumalai .......... H04N 19/597 |
| 2005/0071150 | A1 | 3/2005 | Nasypny |
| 2009/0024556 | A1 | 1/2009 | Hirsch |
| 2009/0222395 | A1 | 9/2009 | Light et al. |
| 2012/0265519 | A1 | 10/2012 | Latendresse |
| 2013/0268534 | A1 | 10/2013 | Mathew et al. |
| 2013/0332478 | A1 | 12/2013 | Bornea |

OTHER PUBLICATIONS

Information extraction: Evaluating named entity recognition from classical Malay documents Siti Syakirah Sazali; Nurazzah Abdul Rahman; Zainab Abu Bakar 2016 Third International Conference on Information Retrieval and Knowledge Management (CAMP) Year: 2016 pp. 48-53 IEEE Conference Publications.*

A priori precision estimation for neutron Triples counting Stephen Croft; Martyn T Swinhoe; Vladimir Henzl 2011 2nd International Conference on Advancements in Nuclear Instrumentation, Measurement Methods and their Applications Year: 2011 pp. 1-7 IEEE Conference Publications.*

Experiences and Challenges in Enhancing Security Information and Event Management Capability Using Unsupervised Anomaly Detection Stefan Asanger; Andrew Hutchison 2013 International Conference on Availability, Reliability and Security Year: 2013 pp. 654-661 IEEE Conference Publications.*

McRae, "Event Based Thematic Role Concepts", published 2010.

Salton et al., "Automatic text decomposition using text segments and text themes", In Proceedings of the Seventh ACM conference on Hypertext (HYPERTEXT '96), 13 pages.

Hare et al., "Admitting that Admitting Verb Sense into Corpus Analyses Makes Sense", Psychology Press, Ltd., 2004.

Bjorne et al; Generalizing Biomedical Event Extraction, 2011 Workshop, pp. 183-191, Portland, Oregon, USA, Jun. 24, 2011.

Buyko et al; Event Extraction from Trimmed Dependency Graphs, pp. 19-27, Boulder, Colorado, Jun. 2009.

Kilcoglu et al; Adapting a General Semantic Interpretation Approach to Biological Event Extraction, 2011 Workshop, pp. 173-182, Portland, Oregon, USA, Jun. 24, 2011.

Kim et al; Corpus annotation for mining biomedical events from literature, pp. 1-25, Published: Jan. 8, 2008.

Leaman et al; Banner: An Executable Survey of Advances in Biomedical Named Entity Recognition, Pacific Symposium on Biocomputing 13:652-663(2008).

Liu et al; From Graphs to Events: A Subgraph Matching Approach for Information Eextraction from Biomedical Text, 2011 Workshop, pp. 164-172, Portland, Oregon, USA, Jun. 24, 2011.

McClosky et al; Event Extraction as Dependency Parsing for BioNLP 2011.

Ohta et al; Event Extraction for Post-Translational Modifications, 2010 Workshop on Biomedical Natural Language Processing, ACL 2010, pp. 19-27, Uppsala, Sweden, Jul. 15, 2010.

Ohta et al; Event Extraction for DNA Methylation.

Pyaasalo et al; Towards Exhaustive Protein Modification Event Extraction, 2011 Workshop on Biomedical Natural Language Processing, ACL-HLT 2011, pp. 114-123, Portland, Oregon, USA, Jun. 23-24, 2011.

Riedel et al; Robust Biomedical Event Extraction with Dual Decomposition and Minimal Domain Adaptation.

Riedel et al; Model Combination for Event Extraction in BioNLP 2011.

Tikk et al; A Comprehensive Benchmark of Kernel Methods to Extract Protein-Protein Interactions from Literature, PLoS Computational Biology | www.ploscompbiol.org, Jul. 2010 | vol. 6 | Issue 7 | e1000837, Kernels for Protein-Protein Interaction Mining.

* cited by examiner

| | PROTEIN KINASE KNOWN TO PHOSPHORYLATE HUMAN P53 504 | PHOSPHORYLATION SITE ON HUMAN P53 506 | TRAINING DATA FROM WHICH EVENT RULES ARE LEARNED 508 |
|---|---|---|---|
| 1. | ATM | SER 15 | ATM PHOSPHORYLATES P53 DIRECTLY AT SER15 (SER18 OF MOUSE P53) AND INDIRECTLY THROUGH OTHER KINASES |
| 2. | ATM | SER 15 | ATR PHOSPHORYLATED P53 AT SER-15 AND SER-37 IN VITRO, SUGGESTING THAT P53 IS A TARGET FOR PHOSPHORYLATION BY ATR IN DNA-DAMAGED CELLS. |
| 3. | CDK | SER 315 | WE USED NON-RADIOACTIVE ELECTROPHORETIC MOBILITY SHIFT ASSAYS TO SHOW THAT C-TERMINAL PHOSPHORYLATION OF P53 PROTEIN BY CDK2/CYCLIN A ON SER 315 |

- RULE DESCRIBING HOW THE AGENT, THEME AND LOCATION ARE RELATED TO THE VERB PHOSPHORYLATE
- *PHOSPHORYLATE* : "RULE": {"SUBJ":"AGENT","OBJ":"THEME","PP:AT1.OBJ:PREP":"LOCATION"}, 602

- RULE DESCRIBING HOW THE AGENT, THEME AND LOCATION ARE RELATED TO THE NOUN FORM OF THE VERB PHOSPHORYLATE
- *PHOSPHORYLATION*: "RULE":{"NSUBJ:PP:BY1.OBJ:PREP":"AGENT", "NSUBJ:PP:OF1.OBJ:PREP":"THEME","NCOMP:PP:AT1.OBJ:PREP":"LOCATION"}} 604

*FIG. 7*

| | INSTANTIATIONS IN TEXT FROM WHICH RULE PATTERNS ARE LEARNED 708 | RELATIONSHIPS 710 |
|---|---|---|
| 1. | ATM PHOSPHORYLATES P53 DIRECTLY AT SER15 (SER18 OF MOUSE P53) AND INDIRECTLY THROUGH OTHER KINASES | AGENT VERB(PRESENT CONTINUOUS) THEME .{0,2} LOCATION 702 |
| 2. | ATR PHOSPHORYLATED P53 AT SER-15 AND SER-37 IN VITRO, SUGGESTING THAT P53 IS A TARGET FOR PHOSPHORYLATION BY ATR IN DNA-DAMAGED CELLS | AGENT VERB(PAST) THEME. {0,2} LOCATION 704 |
| 3. | WE USED NON-RADIOACTIVE ELECTROPHORETIC MOBILITY SHIFT ASSAYS TO SHOW THAT C-TERMINAL PHOSPHORYLATION OF P53 PROTEIN BY CDK2/CYCLIN A ON SER315 | VERB(NOUN FORM) {OF} THEME {BY} AGENT {ON} LOCATION 706 |

FIG. 9

EVENT DETECTION USING ROLES AND RELATIONSHIPS OF ENTITIES

GOVERNMENT RIGHTS

This invention was made with Government support under DARPA contract number W911QX-12-C-0044. THE GOVERNMENT HAS CERTAIN RIGHTS IN THIS INVENTION.

TECHNICAL FIELD

The present invention relates generally to a method, system, and computer program product for detecting events in a given data. More particularly, the present invention relates to a method, system, and computer program product for event detection using roles and relationships of entities.

BACKGROUND

A corpus (plural: corpora) is data, or a collection of data, used in linguistics and language processing. A corpus generally comprises large volume of data, usually text, stored electronically.

Natural language processing (NLP) is a technique that facilitates exchange of information between humans and data processing systems. For example, one branch of NLP pertains to answering questions about a subject matter based on information available about the subject matter domain.

Information about a domain can take many forms, including but not limited to knowledge repositories and ontologies. Such information can be sourced from any number of data sources. The presenter of the information generally selects the form and content of the information. Before information can be used for NLP, generally, the information has to be transformed into a form that is usable by an NLP engine.

Presently, systems and methods are available to parse unstructured data into a structured form. Presently available systems, such as information extraction systems, are adept at extracting and classifying named entities, such as people, cities, genes, proteins etc., from a given corpus. Presently available methods can also establish simple semantic relationships between the extracted entities. Of example, presently available methods can relate that an extracted person entity 'lives in' an extracted city entity, one extracted gene entity 'inhibits' another extracted gene entity, and so on.

Presently available systems and methods for information extraction construct "triples" of extracted information. A triple is an [ENTITY <VERB> ENTITY] construct, where one of the entities is a subject specified in the given corpus, and the subject entity performs an act (verb) specified in the corpus on an object entity specified in the given corpus. For example, given suitable corpus, a presently available system or method can create a triple such as [Barack Obama <president of> US].

Presently, the extracted triple artifacts can be stored, indexed, and made available for semantic processing of data and document retrieval. Existing frameworks such as Resource description Framework (RDF) and Web Ontology Language (OWL) are some examples of presently available methods for extracting such triples.

SUMMARY

The illustrative embodiments provide a method, system, and computer program product for event detection using roles and relationships of entities. An embodiment includes a method for event detection in data. The embodiment identifies, in a training data, a training event and a set of entities participating in the training event. The embodiment determines, for a first entity in the set of entities, a first role occupied by the entity in the event. The embodiment assigns a behavior attribute to the first role. The embodiment determines a relationship of the first role with a second role corresponding to a second entity in the set of entities. The embodiment constructs an event rule, wherein the event rule is usable to detect an event in new data, the event corresponding to the training event, and wherein the event rule comprises a plurality of roles, a plurality of behavior attributes, and the relationship, wherein the plurality of roles includes the first role and the second role, and the plurality of behavior attributes includes the behavior attribute assigned to the first role.

Another embodiment includes a computer usable program product comprising a computer readable storage device including computer usable code for event detection in data.

Another embodiment includes a data processing system for event detection in data, comprising a storage device, wherein the storage device stores computer usable program code, and a processor, wherein the processor executes the computer usable program code.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that often, a relationship present in a corpus is more complex than one entity acting on another entity, as the presently available information extraction methods perceive. Accordingly, the presently available methods for information extraction fail to comprehend the complex relationships between entities in a given corpus, and the resulting rules, e.g., triples, are far too simplistic for applying to data of any significant complexity.

For example, the illustrative embodiments recognize that even a reasonably simple relationship, such as the connection between a person entity and a position entity, often has a temporal aspect associated therewith. For example, the triple [Barack Obama <president of> US] is missing an attribute—the Start Term: 2009—which is associated with the information extracted into the example triple. Depending on the corpus, the Person-Position relationship of this example triple may also be missing a model or sequence information, e.g., Number: 44, because Barack Obama is the 44th President of United States.

As is evident from the simple example described above, the presently available methods of rule construction to extract information from a corpus are lacking in the ability to comprehend complex relationships. Therefore, when the rules created using presently available methods are applied to new data, only the events that match those simplistic rules closely are found in the new data. The rules fail to detect in the new data other events, which are either more complex than the training events based on which the rules were constructed, or present entities different than the entities presented in the training data, or both.

The illustrative embodiments used to describe the invention generally address and solve the above-described problems and other problems related to event detection in given data. The illustrative embodiments provide a method, system, and computer program product for event detection using roles and relationships of entities.

An event is an occurrence of information of interest in a given data. Training data or training corpus (hereinafter, "training data") is data used to construct an event detection rule (hereinafter "event rule"). An event rule is logic to detect an event in a given data. An event rule according to the prior-art is a triple. An event rule according to the illustrative embodiments is a logical representation of a set of roles played by entities when engaged in one or more relationships with each other. Hereinafter, any reference to the term "event rule" refers to the event rule according to an embodiment, unless otherwise specified proximate to where the term is used.

New data is data that has not contributed to the event rule construction, and on which a pre-constructed event rule is applied to detect events. Process data is an example of new data, and comprises data emitted by a process operating in a real world environment. For example, records of financial transactions, data of a biological process, news information, program execution output or log, and conversations or statements, are some examples of process data in which events have to be detected.

An event rule according to an embodiment is n-ary in that the event rule can include any number of roles in the set of roles, as compared to ternary rules of the prior-art, which are limited to three elements in a triple. Furthermore, an n-ary event rule comprises one or more attributes sufficient to identify a type, necessity, or dependency of one or more roles. For example, some roles may be necessary for the event to be detected, i.e., an entity occupying that role must be specified in some form in the given data for the event to be detected as present in the given data.

As another example, some roles may be optional, i.e., an entity occupying that role need not be specified in any form in the given data for the event to be detected as present in the given data. Similarly, some roles may be implied, i.e., an entity occupying that role need not be expressly specified in any form in the given data but such a role can be implicitly present for the event to be detected as present in the given data.

An embodiment uses training data and a domain-specific knowledge repository to learn and extract logical relationships between the roles played by groups of entities in the training data. The embodiment constructs event rules using the discovered roles and relationships.

Furthermore, an event rule according to an embodiment can include attributes and/or logic based on linguistic characteristics of the given data, lexical characteristics of the given data, or a combination of these and other characteristics of the given data. For example, one embodiment identifies a role of a specific entity in a specific training data based on a grammar of a language of the training data. Similarly, an embodiment identifies a relationship between different roles in a specific training data based on the grammar of the language.

Another embodiment normalizes a specific entity in a specific training data based on a lexical reference, such as a dictionary or an ontology, applicable to the training data. Using a lexical reference, another example embodiment identifies a range of distance or separation between entities in the given data to still have the relationship exist between the roles of the entities. Within the scope of the illustrative embodiments, an embodiment can be configured to use a combination of linguistic and lexical references, or other suitable resources and combinations thereof, to construct an event rule.

Another embodiment assigns a confidence score to an event rule. The confidence score of an event rule can be assigned in any suitable manner, including but not limited to the following example manners.

As a first example, a confidence score of an event rule is related to the number of events in the training data based on which the event rule was constructed. In other words, if an event rule is constructed using a larger number of events in the training data as compared to a second event rule, the first event rule has a higher confidence score than the second event rule.

As a second example, a confidence score of an event rule is related to the number of events, which the event rule detects in new data accurately. In other words, if an event rule accurately detects a larger number of events in the new data as compared to a second event rule, the first event rule has a higher confidence score than the second event rule. The second example method of confidence scoring can be used to update a confidence score established using the first example method. From this disclosure, many other methods of assigning and updating confidence scores of event rules will be apparent to those of ordinary skill in the art and the same are contemplated within the scope of the illustrative embodiments.

In an example subject matter domain of Life Sciences, an embodiment can be used to identify logical connections between the roles played by various proteins and amino acids as they interact with each other in biological processes. The roles and relationships can be transformed into one or more event rules to detect protein interaction events in previously unseen or unused data from ongoing biological processes.

As an example, suppose the training data includes the sentence, "ATM phosphorylates p53 directly at Ser15 (Ser18 of mouse p53) and indirectly through other kinases." An embodiment identifies at least three roles for the event "phosphorylate" in this data, for example, an agent role played by the entity "ATM", a theme role played by protein P53, and a location role played by Ser15.

An event rule describes how the agent and the verb (phosphorylate) are related in the corpora of the given subject matter domain, i.e., the agent performs the verb. The same event rule or a different event rule describes how the theme and the verb are related in the corpora, that is, the verb is performed upon the theme. The same event rule or a different event rule describes how the location and the verb are related in the corpora, to wit, the verb is performed at the location.

Based only on the partial analysis of the sentence, an example event rule for phosphorylation event according to an embodiment is therefore as follows:

Phosphorylates: {Agent: ATM; Theme: p53; Location: Ser15}

Thus, while specific entities are specified in the training data, an embodiment has normalized the entities according to the roles they play. If a sentence in a new data omits or changes an entity, the event rule will still be able to detect the event by using this rule. For example, if the new data states a phosphorylation event without a location, the event rule implicitly comprehends the location if other roles are satisfied in the new data.

Additional analysis according to other embodiments, as will be explained with respect to certain figures elsewhere in this disclosure, can add or modify other information or otherwise manipulate this example event rule to form a more complex event rule.

A method of an embodiment described herein, when implemented to execute on a device or data processing system, comprises substantial advancement of the functionality of that device or data processing system in event detection. For example, in order to detect an event, the prior-art requires simple relationships between two entities—as defined by a triple—to exist in the given data. In contrast, an embodiment can detect an event even when more complex relationships between more numerous entities are described in the given data. Operating in a manner described herein, an embodiment uses normalized roles of the entities and their inter-relationships to identify the events in which they participate, and making detection of the event possible even with replaced or omitted entities. Such manner of event detection is unavailable in presently available devices or data processing systems. Thus, a substantial advancement of such devices or data processing systems by executing a method of an embodiment improves the accuracy and volume of the detected events.

The illustrative embodiments are described with respect to certain characteristics, attributes, entities, roles, positions, domains, data, events, event rules, structures of event rules, conditions, values, thresholds, tolerances, confidence scores, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
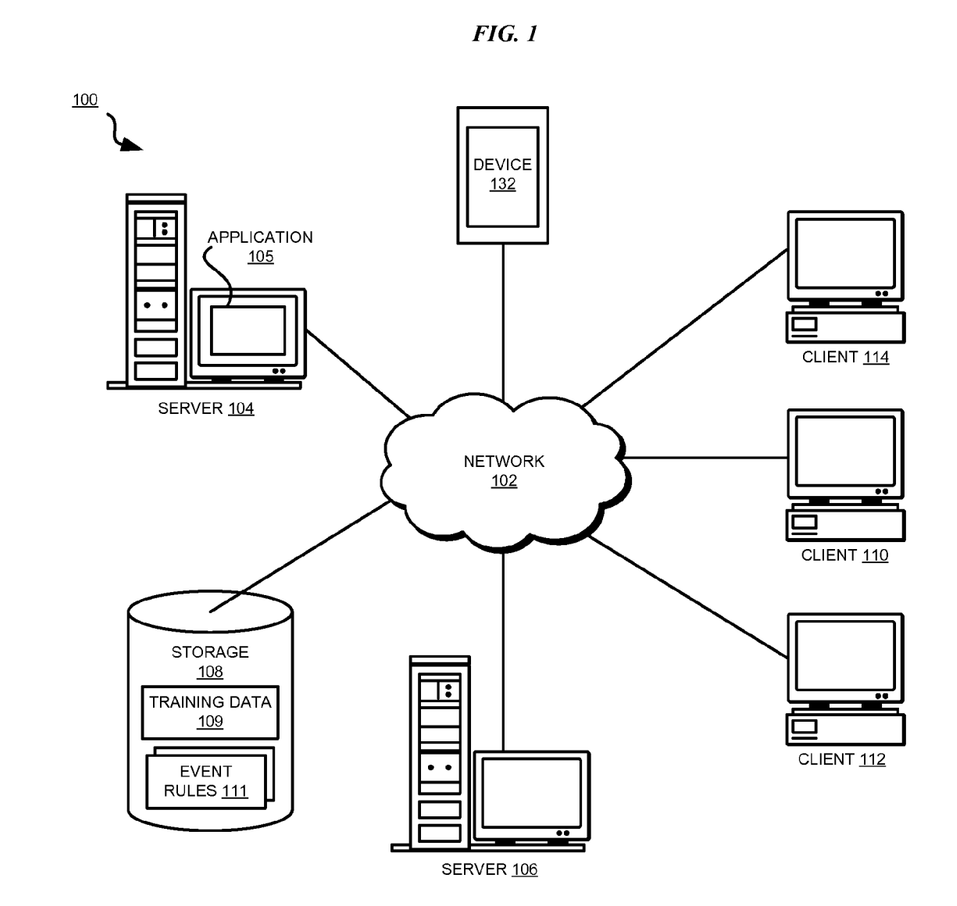
FIG. 1 depicts a block diagram of a network of data processing systems in which illustrative embodiments may be implemented.
Figure 2:
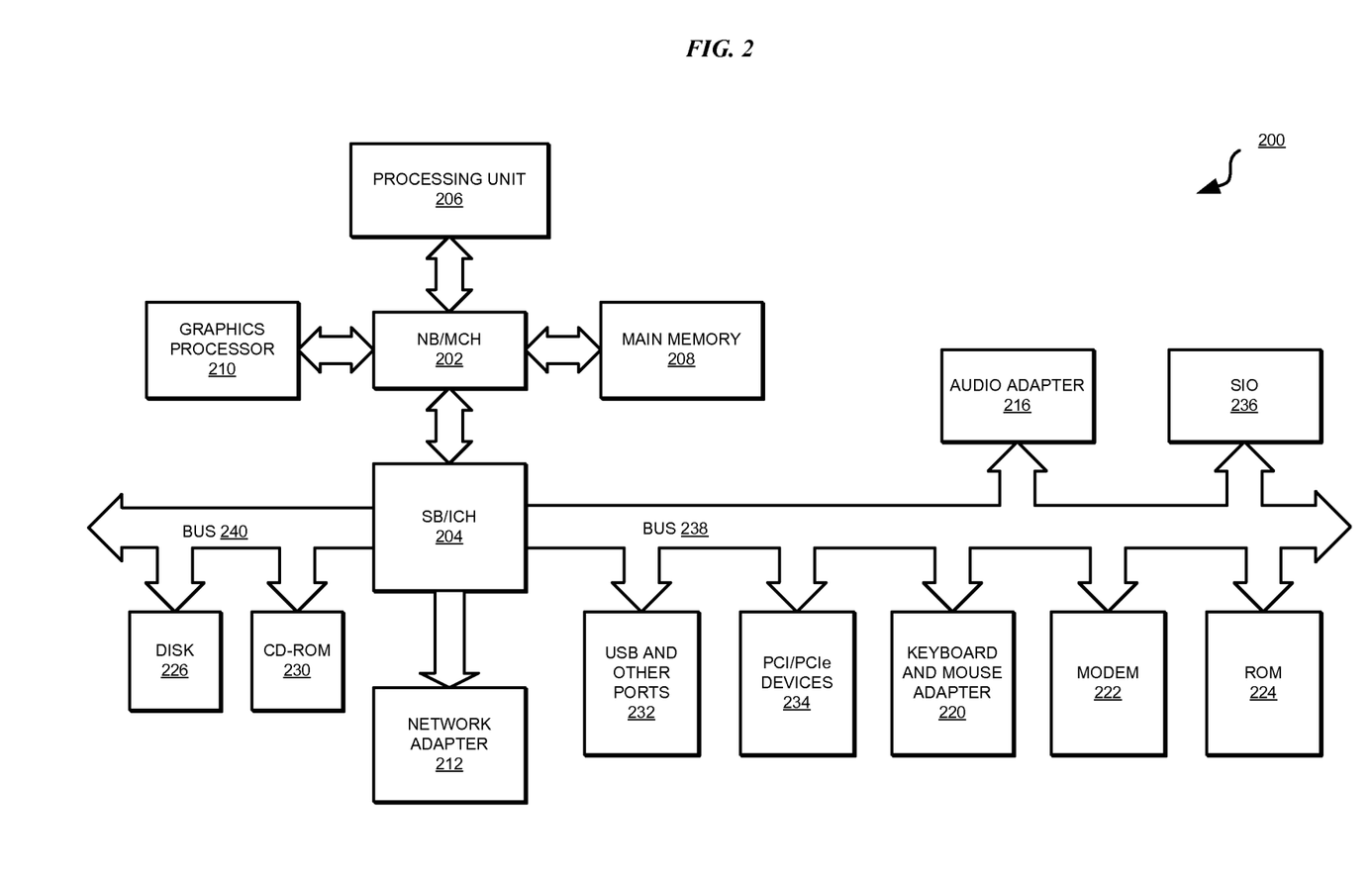
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Application 105 in server 104 implements one or more embodiments described herein. Training data 109 comprises data usable in conjunction with a domain-specific knowledge repository (not shown) to construct or modify one or more event rules as described herein. Event rules 111 comprise one or more event rules constructed by application 105 using training data 109, as described herein. Application 105 also uses one or more event rules 111 in conjunction with a domain-specific knowledge repository (not shown) on new data (not shown) to detect events therein in a manner described in this disclosure. Any data processing system, e.g., server 106, client 112, or device 132, or an application executing thereon may be a source of the new data.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc.

licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
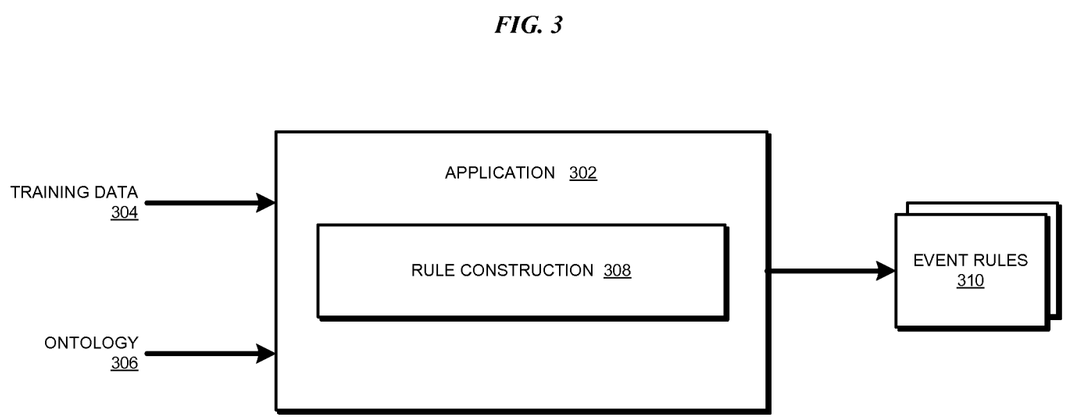
FIG. 3 depicts a block diagram of an example application for event detection using roles and relationships of entities in accordance with an illustrative embodiment.

With reference to FIG. 3, this figure depicts a block diagram of an example application for event detection using roles and relationships of entities in accordance with an illustrative embodiment. Application 302 can be implemented as application 105 in FIG. 1.

Application 302 receives training data 304 and domain-related knowledge repository, e.g., ontology 306, as inputs. Using inputs 304 and 306, component 308 of application 302 constructs one or more event rules 310.

Training data 304 is an example of training data 109 in FIG. 1. Event rules 310 are examples of event rules 111 in FIG. 1. In an example operation, component 308 identifies portions of training data 304, such as a sentence in a corpus comprised in training data 304. Using ontology 306, component 308 identifies one or more entities in the sentence. Using a linguistic resource—such as a language processing engine loaded with the grammar of a language of the sentence, a lexical resource—such as the language processing engine loaded with a lexicon and/or a lexical parser, component 308 identifies the roles occupied by the identified entities.

For example, component 308 uses a characteristic of the entity that may be available from the corpus, the linguistic resource, the lexical resource, or some combination thereof, to normalize the identified entity in to a role performed by the entity in the sentence. In other words, component 308 attributes a behavior to the role as opposed to an identity of the entity as in the prior art.

For example, if the sentence were, "a bat hits a ball", the bat would be an entity, the role of the bat entity would be to hit or strike an another entity, to wit, the ball entity. Accordingly, a behavior of the role of the bat entity would be the ability to strike another entity. Such a normalized manner of representing entities enables the resulting event rule to identify a tennis shot as a fitting event, even if the training data never included any data about a tennis racquet.

Some prior-art methods compare entities in a triple with synonyms of the entities. However, according to an embodiment, the characterization of the bat as an object of certain proportions, shape, size, color, texture, material etc., (i.e., a normalized entity) that its usable to (i.e., performing in a role to) impart force (i.e., having a behavior) is distinct from and far more enabling than simply collecting all synonyms of the word "bat" from a dictionary with the expectation that tennis racquet will be one of those synonyms.

Furthermore, the example event rule can be further enhanced according to another embodiment. The hitting or striking action can be qualified in many ways, and can be separated from another entity in the data by some number of words. Depending upon the linguistic and lexical resources and upon the training data, the embodiment modifies the n-ary event rule with additional attributes, such as one or more adverbs, adjectives, conjunctions, prepositions, and the like, which can optionally qualify a role represented in the event rule.

Furthermore, depending upon the linguistic and lexical resources and upon the training data, the embodiment further specifies a range of distance that can exist between the roles specified in the event rule. For example, if example sentences in the training data showed the verb of hitting or an equivalent thereof, separated from the object entity that was hit, by zero words, one word, two words, and so on up to five words, the embodiment modifies the n-ary event rule with distance specification associated with all or some of the n attributes therein.

Such an event rule, when applied to new data is far more capable of identifying events in the new data as compared to the prior-art triple. For example, suppose that a sentence in the new data were, "That was an amazing return of a fast volley." The event rule according to an embodiment will be able to identify the presence of a tennis shot event in the sentence even if there is no expressly provided agent role, no expressly provided theme role, but a racquet can be implied from the implicit hitter role, a ball can be implied from the implicit theme role, because a variation of the verb "hit" with one or more optional qualifiers is present within the specified distance range from such implied roles according to the event rule.

In one embodiment, an event rule in event rules 310 has associated therewith a confidence score. According to the embodiment, component 308 computes the confidence score for the event rule based on the number of event instances in training data 304 that were used to configure the event rule, as described elsewhere in this disclosure. In another embodiment, component 308 modifies a confidence score of an event rule based on a feedback of the accuracy of event identification in new data using the event rule.

Figure 4:
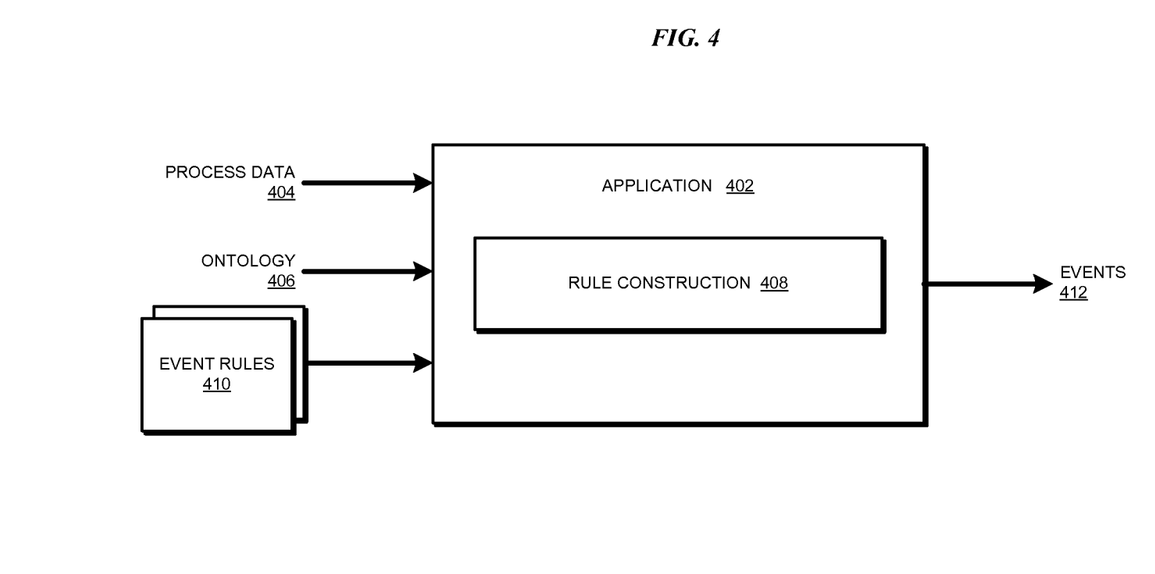
FIG. 4 depicts a block diagram of an example application for event detection using roles and relationships of entities in accordance with an illustrative embodiment.

With reference to FIG. 4, this figure depicts a block diagram of an example application for event detection using roles and relationships of entities in accordance with an illustrative embodiment. Application 402 can be implemented as application 105 in FIG. 1.

Application 402 receives new data 404, e.g., process data from a process, and domain-related knowledge repository, e.g., ontology 406, as inputs. Using inputs 404 and 406, component 408 of application 402 applies a subset of event rules 410, which are accessible from application 402. For example, event rules 410 comprise the set of event rules 310 constructed in FIG. 3.

In an example operation, component 408 identifies portions of new data 404, such as a sentence in a corpus comprised in new data 404. Using a subset of event rules 410 according to ontology 406, component 408 identifies one or more entities in the sentence that satisfy the express, implied, necessary, or optional roles in an event rule 410. When an event rule is satisfied, application 402 outputs event 412.

In one embodiment, event rules 410 are selected based on the confidence scores of the event rules in a larger set of event rules. For example, only those event rules whose confidence scores exceed a threshold score form set 410 of event rules. The subset of event rules 410 selected for event detection in a particular portion of new data 406 depends upon the applicability of the subset to that portion. The applicability can be determined by any suitable method, including but not limited to using an NLP engine to determine the context of the portion, linguistic characteristics of the portion, lexical characteristics of the portion, or some combination thereof.

Figure 5:
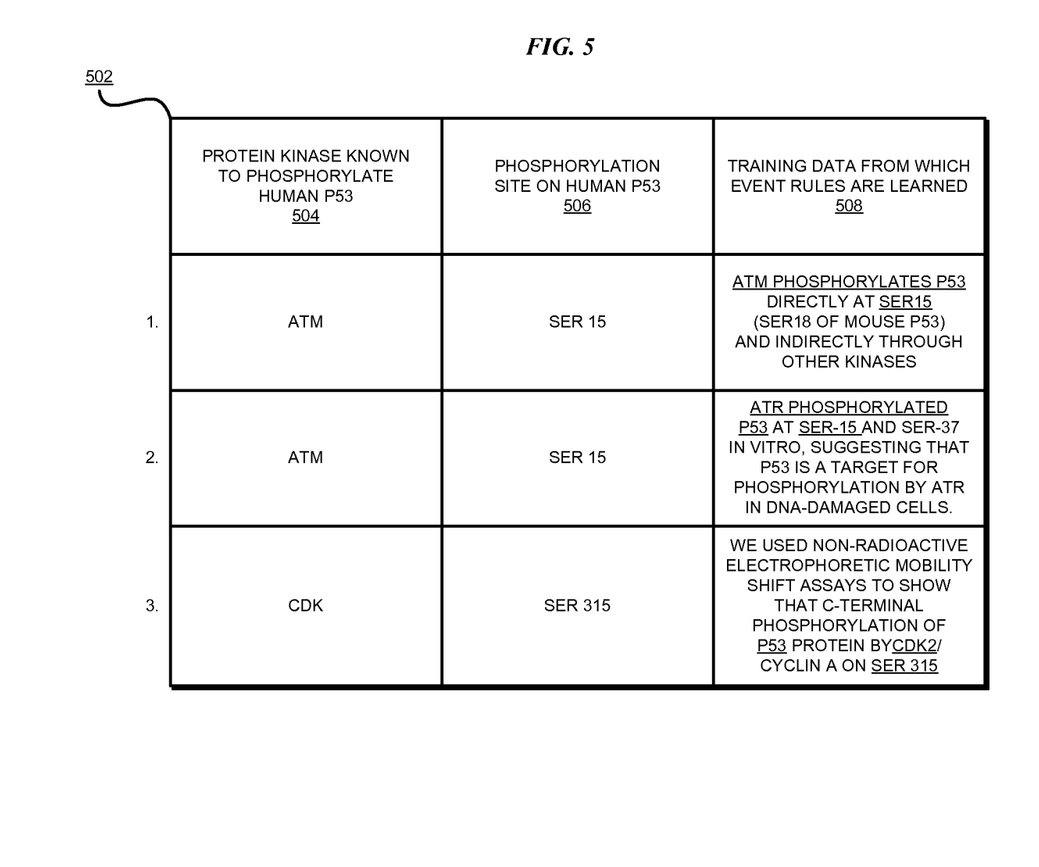
FIG. 5 depicts a table of an example training data in accordance with an illustrative embodiment.

With reference to FIG. 5, this figure depicts a table of an example training data in accordance with an illustrative embodiment. Data in table 502 is usable as training data 304 in FIG. 3.

The phosphorylation example described above in this disclosure is used again to illustrate the example training data in table 502. Column 504 provides three example entities that act in an agent role in rows 1, 2, and 3. Similarly, column 506 provides three example entities that operate in a location role in rows 1-3. The agents and themes in rows 1-3 are extracted, for training application 302, from the sample training data in the corresponding rows in column 508.

Thus, if application 302 is to construct event rules to extract Post Translational Modifications to protein p53 events, training data in table 502 provides possible agent entities (kinase), possible location entities of the phosphorylation event (amino acid residue), any upstream/downstream biological processes associated with the event, and so on. Furthermore, training data 502 may be limited only to some columns, e.g., columns 504 and 506, for some embodiments, and include all columns or equivalents thereof for other embodiments. Training data 502 may also provide negative examples, which an embodiment can use to create exclusions in event rules.

Figure 6:
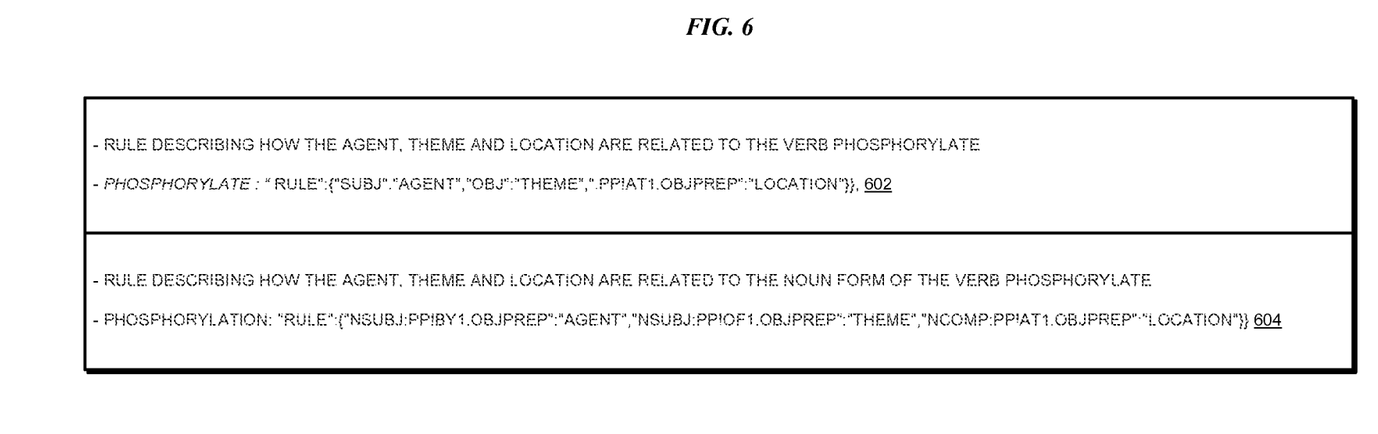
FIG. 6 depicts an example manner of constructing an event rule from training data in accordance with an illustrative embodiment.

With reference to FIG. 6, this figure depicts an example manner of constructing an event rule from training data in accordance with an illustrative embodiment. Application 302 in FIG. 3 constructs event rule 602 using training data 502 in FIG. 5.

For example, rows 1 and 2 in column 508 in FIG. 5 describe training data examples for the verb "phosphorylate." Those examples also indicate that the agent role appears as the subject entity, the theme role appears as the object entity, and a preposition "at" can optionally qualify the location role, when the data relates to the act or event "phosphorylate." Event rule 602 depicts these relationships of the agent role, the theme role, the location role, and optional or additional attributes in an n-ary form.

Similarly, row 3 in column 508 in FIG. 5 describes training data examples for the noun form of verb "phosphorylate", to wit, "phosphorylation." That example also indicates that the agent role appears as the subject entity with a possible preposition "by", the theme role appears as the object entity with a possible preposition "of", and a preposition "at" can optionally qualify the location role, when the data relates to the act or event "phosphorylation." Event rule 604 depicts these relationships of the agent role, the theme role, the location role, and optional or additional attributes in an n-ary form.

Figure 7:
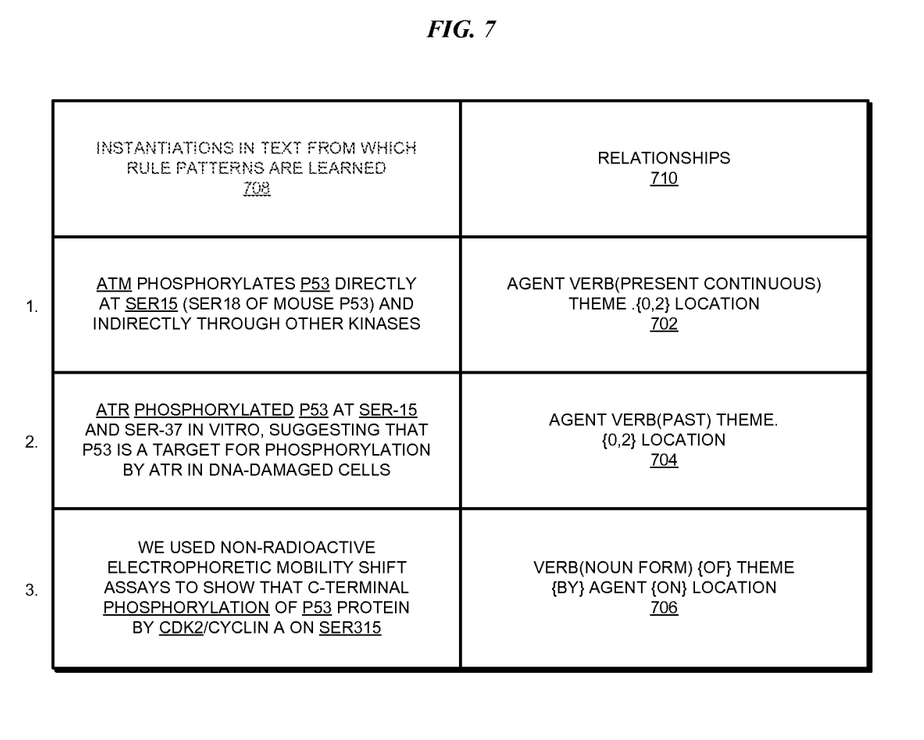
FIG. 7 depicts an example manner of constructing an event rule from training data in accordance with an illustrative embodiment.

With reference to FIG. 7, this figure depicts an example manner of constructing an event rule from training data in accordance with an illustrative embodiment. Application 302 in FIG. 3 constructs relationships 702 and 704 in event rule 602 in FIG. 6, and relationship 706 in event rule 604 in FIG. 6, using training data 502 in FIG. 5.

Rows 1, 2, and 3 in column 708 include the sample data from rows 1, 2, and 3 in column 508 in FIG. 5. Relationship 702 in row 1 of column 710 is based on the sample data in row 1 of column 708.

The application implementing an embodiment determines that when verb "phosphorylate" is in a present continuous tense (phosphorylates), as in sample data in row 1 of column 708, relationship 702 of the theme role with the verb can include a distance of zero-to-two words or structures from the verb.

Similarly, the application determines that when verb "phosphorylate" is in a past tense form (phosphorylated), as in sample data in row 2 of column 708, relationship 704 of the theme role with the verb can include a distance of zero-to-two words or structures from the verb. The application also determines that when verb "phosphorylate" is in a noun form (phosphorylation), as in sample data in row 3 of column 708, relationship 706 of the various roles can include one or more prepositions qualifying the agent role, the theme role, and the location role.

These example training data, event rules, roles, distances, and other attributes of the event rules, and the manner of expressing those attributes, are not intended to be limiting on the illustrative embodiments. Those of ordinary skill in the art will be able to conceive other ways of relating and expressing other attributes in event rules and the same are contemplated within the scope of the illustrative embodiments.

Figure 8:
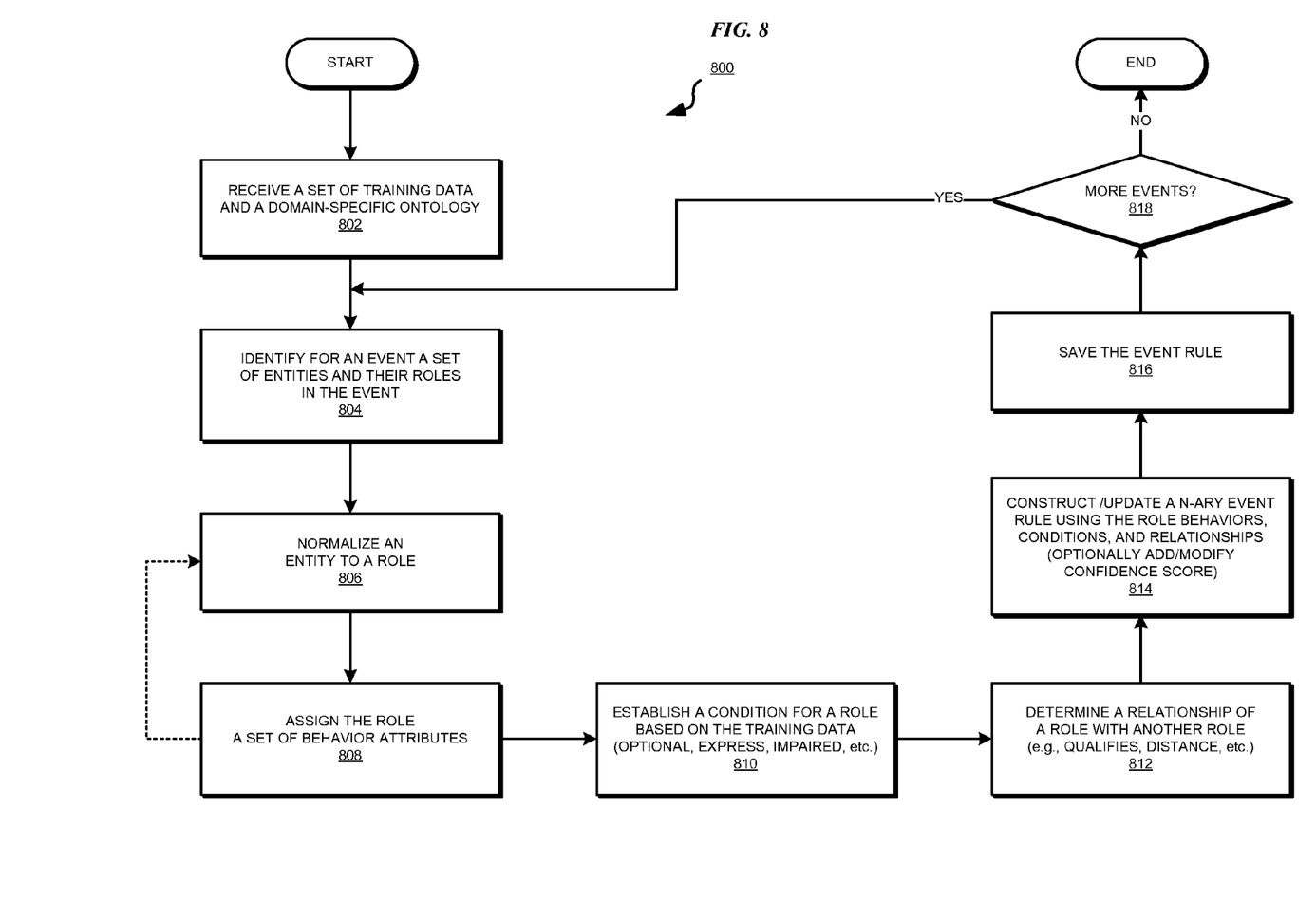
FIG. 8 depicts an example process for constructing an event rule in accordance with an illustrative embodiment.

With reference to FIG. 8, this figure depicts an example process for constructing an event rule in accordance with an illustrative embodiment. Process 800 can be implemented in application 302 in FIG. 3.

The application receives a set of training data and a domain related knowledge repository (block 802). The application identifies, for an event in the training data, a set of entities and their roles in the event (block 804).

The application normalizes an entity to the role that entity plays in the event (block 806). The application assigns the role a set of behavior attributes based on the manner in which the role participates in the event (block 808). The application may repeat blocks 806 and 806 for as many entities as may exist related to the event in the training data.

The application establishes a condition for a role based on the training data (block 810). For example, the application establishes whether the role or an attribute associated therewith is optional, mandatory, expressly provided, or implicitly provided in the data.

The application determines a relationship of a role that participates in an event with another role that participates in the event (block 812). The application may repeat blocks 810 and 812 any number of times depending upon how many relationships exist between various roles in the event.

The application constructs a new event rule or updates an existing event rule (block 814). Particularly, the application constructs or updates an event rule using the role behaviors, conditions, and relationships. Optionally, the application may add or modify a confidence score associated with the event rule.

The application saves the event rule (block 816). The application determines whether more training events exist in the training data (block 818). If more events exist ("Yes" path of block 818), the application returns process 800 to block 804. If no more events exist ("No" path of block 818), the application ends process 800 thereafter.

Figure 9:
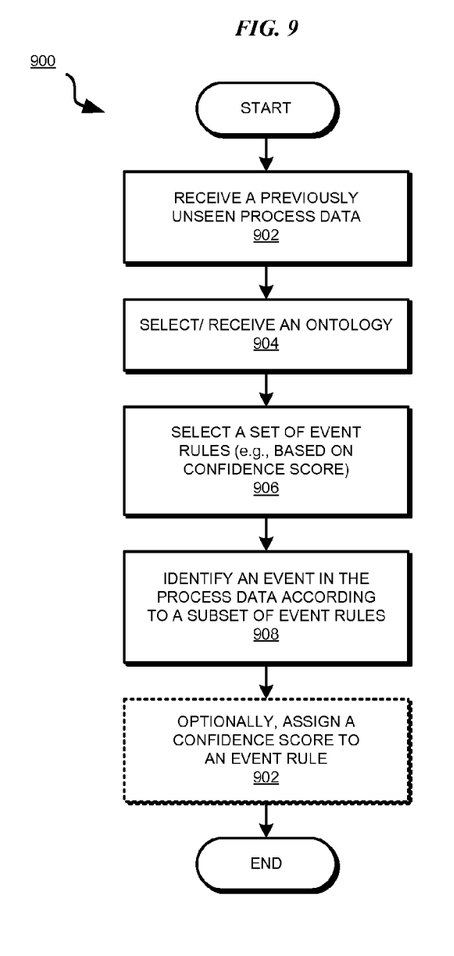
FIG. 9 depicts a flowchart of an example process for event detection using roles and relationships of entities in accordance with an illustrative embodiment.

With reference to FIG. 9, this figure depicts a flowchart of an example process for event detection using roles and relationships of entities in accordance with an illustrative embodiment. Process 900 can be implemented in application 402 in FIG. 4.

The application receives new data, e.g., previously unseen or unused process data (block 902). The application selects or receives a domain-related knowledge repository, such as an ontology (block 904).

The application selects a set of event rules, e.g., those event rules whose confidence score exceeds a threshold (block 906). The application identifies an event in the new data according to a subset of the event rules (block 908).

The application optionally assigns a confidence score to an event rule in the subset, depending upon the accuracy of the event detected using that event rule (block 910). The application ends process 900 thereafter.

Thus, a computer implemented method, system or apparatus, and computer program product are provided in the illustrative embodiments for event detection using roles and relationships of entities. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for event detection in data, the method comprising:
   identifying, in a training data, a training event and a set of entities participating in the training event;
   determining, for a first entity in the set of entities, a first role occupied by the entity in the event;
   assigning a behavior attribute to the first role;
   determining a relationship of the first role with a second role corresponding to a second entity in the set of entities; and
   constructing an event rule, wherein the event rule is usable to detect an event in new data, the event corresponding to the training event, and wherein the event rule comprises a plurality of roles, a plurality of behavior attributes, and the relationship, wherein the plurality of roles includes the first role and the second role, and the plurality of behavior attributes includes the behavior attribute assigned to the first role.

2. The method of claim 1, further comprising:
   assigning the event rule a confidence score, the confidence score corresponding to a number of training events in the training data used in constructing the event rule.

3. The method of claim 1, further comprising:
   receiving the new data;
   selecting the event rule;
   determining whether a new first entity in the new data occupies the first role, whether the new first entity participates in the new data according to the behavior attribute of the first role, whether the new first entity has the relationship with a new second entity in the second role, and whether a third new entity is present in the new data according to a condition in the event rule; and
   detecting, responsive to the determining being affirmative, the event in the new data.

4. The method of claim 3, further comprising:
   assigning a second confidence score to the event rule according to the event actually being represented in the new data.

5. The method of claim 3, wherein the event rule is selected as a member of a set of event rules, the selecting being responsive to the confidence score of the event rule exceeding a threshold.

6. The method of claim 1, further comprising:
   determining whether a third role corresponding to a third entity is present in the training data according to a condition; and
   adding the condition and the third role to the event rule.

7. The method of claim 6, wherein the condition comprises an optional use of the third role.

8. The method of claim 6, wherein the condition comprises a mandatory presence of the third role.

9. The method of claim 6, wherein the condition comprises an implied participation of the third role.

10. The method of claim 6, wherein the event rule further comprises the condition and the third role.

11. The method of claim 1, further comprising:
    determining, to configure the behavior attribute, a manner in which the first role operates in the event according to one or a linguistic resource and a lexical resource.

12. The method of claim 1, wherein the set of entities comprises more than two entities, and the event rule comprises more than two roles.

13. A computer usable program product comprising a computer readable storage device including computer usable code for event detection in data, the computer usable code comprising:
    computer usable code for identifying, in a training data, a training event and a set of entities participating in the training event;
    computer usable code for determining, for a first entity in the set of entities, a first role occupied by the entity in the event;
    computer usable code for assigning a behavior attribute to the first role;
    computer usable code for determining a relationship of the first role with a second role corresponding to a second entity in the set of entities; and
    computer usable code for constructing an event rule, wherein the event rule is usable to detect an event in new data, the event corresponding to the training event, and wherein the event rule comprises a plurality of roles, a plurality of behavior attributes, and the relationship, wherein the plurality of roles includes the first role and the second role, and the plurality of behavior attributes includes the behavior attribute assigned to the first role.

14. The computer usable program product of claim 13, further comprising:
    computer usable code for assigning the event rule a confidence score, the confidence score corresponding to a number of training events in the training data used in constructing the event rule.

15. The computer usable program product of claim 13, further comprising:
   computer usable code for receiving the new data;
   computer usable code for selecting the event rule;
   computer usable code for determining whether a new first entity in the new data occupies the first role, whether the new first entity participates in the new data according to the behavior attribute of the first role, whether the new first entity has the relationship with a new second entity in the second role, and whether a third new entity is present in the new data according to a condition in the event rule; and
   computer usable code for detecting, responsive to the determining being affirmative, the event in the new data.

16. The computer usable program product of claim 15, further comprising:
   computer usable code for assigning a second confidence score to the event rule according to the event actually being represented in the new data.

17. The computer usable program product of claim 15, wherein the event rule is selected as a member of a set of event rules, the selecting being responsive to the confidence score of the event rule exceeding a threshold.

18. The computer usable program product of claim 13, wherein the computer usable code is stored in a computer readable storage device in a data processing system, and wherein the computer usable code is transferred over a network from a remote data processing system.

19. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

20. A data processing system for event detection in data, the data processing system comprising:
   a storage device, wherein the storage device stores computer usable program code; and
   a processor, wherein the processor executes the computer usable program code, and wherein the computer usable program code comprises:
   computer usable code for identifying, in a training data, a training event and a set of entities participating in the training event;
   computer usable code for determining, for a first entity in the set of entities, a first role occupied by the entity in the event;
   computer usable code for assigning a behavior attribute to the first role;
   computer usable code for determining a relationship of the first role with a second role corresponding to a second entity in the set of entities; and
   computer usable code for constructing an event rule, wherein the event rule is usable to detect an event in new data, the event corresponding to the training event, and wherein the event rule comprises a plurality of roles, a plurality of behavior attributes, and the relationship, wherein the plurality of roles includes the first role and the second role, and the plurality of behavior attributes includes the behavior attribute assigned to the first role.

* * * * *